Figure 1:
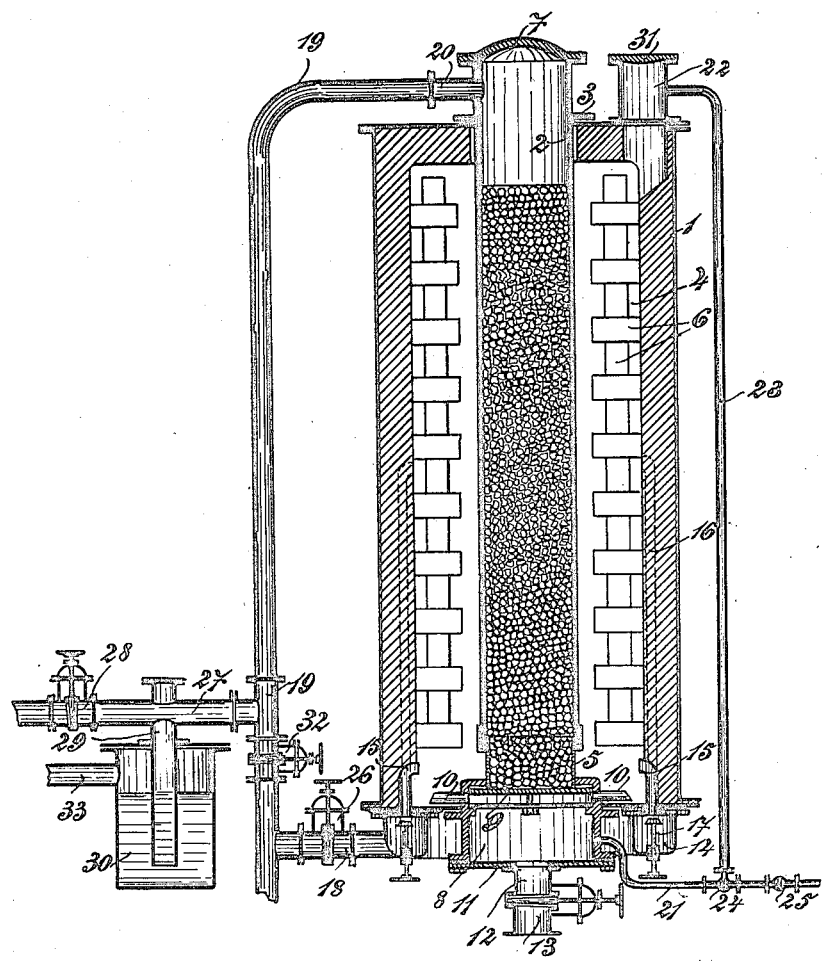

A. MESSERSCHMITT.
APPARATUS FOR PRODUCING HYDROGEN.
APPLICATION FILED JUNE 26, 1912.

1,225,262.

Patented May 8, 1917.
3 SHEETS—SHEET 1.

A. MESSERSCHMITT.
APPARATUS FOR PRODUCING HYDROGEN.
APPLICATION FILED JUNE 26, 1912.

1,225,262.

Patented May 8, 1917.
3 SHEETS—SHEET 2.

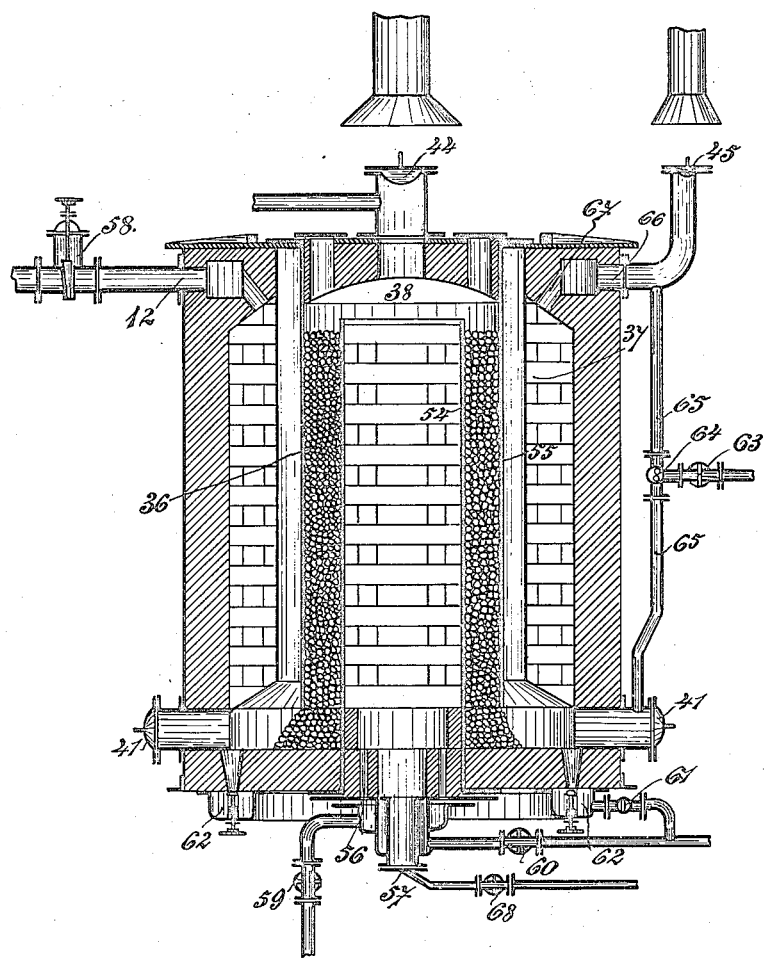

UNITED STATES PATENT OFFICE.

ANTON MESSERSCHMITT, OF STOLBERG, GERMANY.

APPARATUS FOR PRODUCING HYDROGEN.

1,225,262.  Specification of Letters Patent.  Patented May 8, 1917.

Application filed June 26, 1912. Serial No. 706,119.

*To all whom it may concern:*

Be it known that I, Dr. ANTON MESSERSCHMITT, a subject of the Emperor of Germany, and residing at No. 60 Rathhausstrasse, Stolberg, Germany, have invented certain new and useful Improvements in Apparatus for Producing Hydrogen, of which the following is a specification.

This invention relates to apparatus for producing hydrogen; and it comprises a reaction chamber, a charge of active ferruginous material in said chamber, a furnace chamber in heat imparting relationship to the reaction chamber, means for supplying steam, air and reducing gas and means whereby the steam and reducing gas currents may be passed through either the reaction chamber or the furnace chamber, or both successively; and it also comprises in such an apparatus a vertical tubular reaction chamber in heat receiving relationship to a vertical furnace chamber, said reaction chamber being somewhat shorter than said furnace chamber to furnish communication between the same at one end; all as more fully hereinafter set forth and as claimed.

Apparatus usually employed for commercial production of hydrogen are of two general types; the retort type and the producer type. Both of these types of apparatus possess disadvantages which it is the object of the present invention to overcome.

The retort type of apparatus usually comprises iron cylinders provided with a refractory jacket and in use such cylinder is heated externally through the jacket during the heating phase of the process as is well understood. Owing to the presence of the jacket the transfer of heat conducted to the reaction material contained in the retort is impeded and therefore in order to obtain the required temperatures in the reaction material the temperature in the heating chamber surrounding the retort is necessarily kept very high. The wall temperature is necessarily higher than the core temperature. Frequently local overheating of the charge results and this in turn results in local fusion of the reaction material so that it conglomerates more or less and forms a mass which the steam and reducing gas cannot readily permeate. The producing capacity of the apparatus depends upon the area of active surface exposed to the draft current. Fused metal is also apt to adhere and fuse to the retort walls with the result that frequently it has to be removed therefrom or a new retort supplied. In an attempt to eliminate the disadvantages arising from the use of jacketed iron retorts in some instances the jackets have been dispensed with but such unjacketed retorts have proved impracticable because they become damaged in a short period of time at the temperature imparted by the action of the flame and under the continuous oxidizing effect of the furnace gases to which they are subjected. These retorts are usually used in furnace chambers in which there is a lack of suitable means for maintaining an equilibrium of pressure inside and outside the reaction chamber; within the reaction chamber and within the heating chamber. With unequal pressure in the heating chamber and in the reaction chamber, the gases used during the process permeate freely through the walls of the iron retort.

The producer type of apparatus usually comprises an iron retort or reaction chamber located in a gas producer in such manner that the retort is directly heated by the sensible heat of the ignited coke in the producer while the hot gas generated in the producer in the ordinary way is admitted directly into the retort in order to reduce the ferrous material. The iron is subsequently oxidized with a production of hydrogen by means of steam admitted into the retort through separate pipe coils. Owing to the unavoidable and considerable temperature fluctuation in the coke charge incident to the operation of the producer and the combined attacks of heat, coke, slag, steam and air on the retort material, the use of such producer type of apparatus has not been particularly successful. The so-called producer type of apparatus may be said to also include a form in which large producer chambers or shaft furnaces have been filled with the reaction material and which in use have been subjected to direct periodic internal heating. In the use of such type of producer apparatus it is impossible to heat uniformly the large mass of poorly conducting reaction material. Overheating frequently occurs in the material in the neighborhood of the heating zone while the remoter zones are relatively cool. In spite of strong heating this type of apparatus does not succeed in storing up sufficient heat in the ferrous charge, so that the reaction soon weakens, and at too low temperature ceases altogether. Another important drawback of this type lies in the fact that the ferrous charge is made so impure by the large quantity of hot gases passing through, that it soon loses its activity.

The present invention eliminates the objectionable overheating and uneven heating of the reaction material, the fusing of the reaction mass to itself and to the sides of the retort, which are incidental to hitherto known hydrogen producing apparatus, while at the same time the present invention retains all the advantages of the known processes and secures additional advantages such as the production of purer hydrogen and a low consumption of reducing gas and steam.

Figure 2:
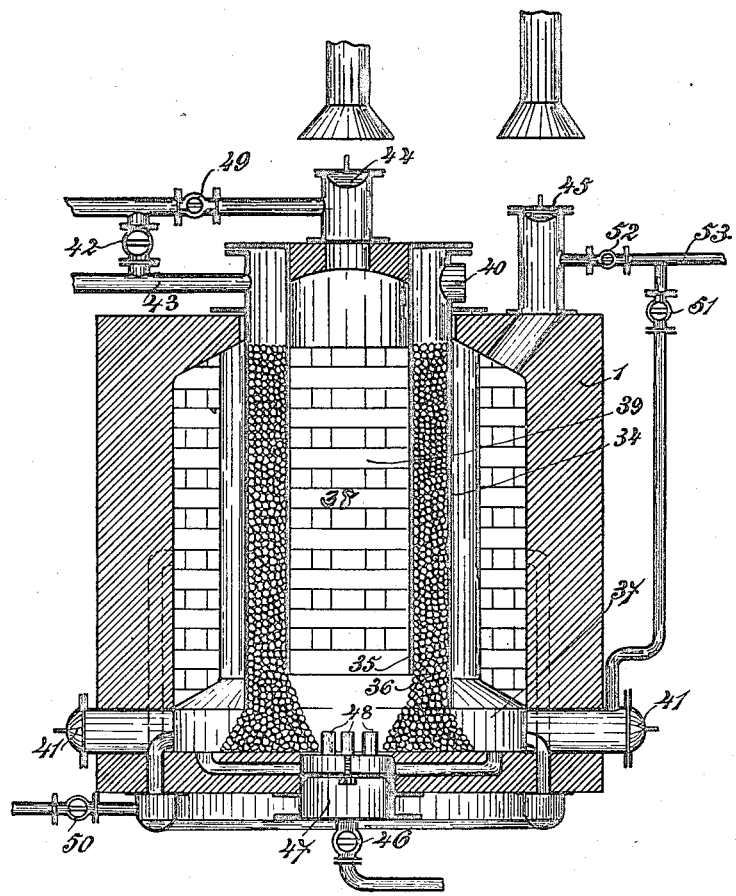

In the accompanying drawings showing several forms of specific embodiments of my invention, Figure 1 is a vertical section of one form; Fig. 2 is a vertical section of a modification; and Fig. 3 is a similar view of a somewhat different form from that shown in Fig. 2.

Referring first to Fig. 1: 1 indicates a heating chamber wall which is preferably made of suitable refractory material adapted to withstand and to store the heat incidental to the process. This chamber is provided with a vertical preferably loosely but airtight connected reaction chamber in the form of a cylinder 2 having near its upper end the flange 3 which maintains it in depending position in the heating chamber 1. This reaction chamber is imperforate except at its lowermost end 5 where it is provided with a cylindrical grating or screen which prevents the reaction material from falling into the heating chamber 4, but which allows easy passage of the various draft currents. The heating chamber is provided with the refractory lining 6 comprising a checkerwork or labyrinth of firebrick or other fireproof material which converts the heating chamber into a superheating and heat storing inclosure.

The upper end of the column or reaction chamber 2 is provided with a charging opening which may be closed by means of a cover 7. The lower end of the heating chamber 4 is in communication with an air box 8 (having a cover 9) by means of radially projecting tubes or conduits 10 which have for their purpose to supply air from the box 8 to the heating chamber 4. The box is closed at the bottom by means of a removable cover 11 which is fitted with a pipe connection 12 leading to a source of air under pressure. A gate valve 13 is provided for regulating the air supplied to this box.

Arranged concentrically with the box 8 there is an annular gas casing 14 from which rise vertical pipes 15 and 16 adapted to supply gas to different levels in the heating chamber 4. These pipes 15 and 16 are uniformly distributed around the casing 14 and are so arranged that the long pipes 16 alternate with the short ones 15. Valves 17 operated from the outside serve to control the supply of gas to these pipes. This annular casing 14 is in communication through a branch pipe 18 with the main gas pipe 19 which communicates at 20 with the top of the reaction chamber or column.

The box 8 may be supplied with steam from a pipe 21 connected with the chimney 22 by means of the pipe 23. At the junction of the pipes 21 and 23 there is provided a 3-way cock 24 by means of which the steam can be caused to pass either through the pipe 21 or the pipe 23. The valve 25 beyond the valve 24 serves for the purpose of shutting off steam when desired.

From the main gas pipe 19 there branches an auxiliary waste gas pipe 27, provided with a valve 28, and leading to a steam boiler furnace (not illustrated) or other place of use.

From the pipe 27, a pipe 29 branches downward into a vessel 30 provided with a water seal. A pipe 33 serves for the removal of the hydrogen from the vessel 30.

In the use of the form of my invention shown in Fig. 1 the furnace or chamber 4 is heated by combustion of gas derived from any suitable source through pipe 19, the chimney register 31, the gas valve 26 and the air valve 13 being open. The gas enters the heating chamber through pipes 15 and 16 and is burnt by air from the radial pipes 10. The heat of combustion enters the reaction material in chamber 2 by conduction through the wall. The waste gases escape through the open valve 31 into the chimney. As soon as the furnace is at red heat, and the reduction material inside the column at a corresponding temperature, the reduction of the material can take place. By now opening the valve 32, reducing gases, if necessary previously heated, are admitted through 19 and 20 into the top of the column and pass downward through the hot reaction material, reducing it.

The waste gas escaping from the open lower end of the column passes upward through the heating chamber 4 and thence through the register 31 to escape. With suspended columns of the type shown this waste gas, particularly when it is combustible, is preferably burnt in the heating chamber by means of air admitted through the pipes 10, and thus utilized in the heating.

On the other hand the reduction reaction can be carried out with a high degree of superheat of the reducing gases, by changing the direction of flow just stated and passing the gases through the pipes 15 and 16 into the heating space 4, air valve 13 being closed and the valve 26 open. The highly superheated reducing gases then arrive at the open lower end of the column and flow upward through the same, reducing the reaction material, after which they escape through 20, 19 and 27, past the open valve 28, to a steam boiler furnace in which they may be completely burnt.

The reduction process is preferably so conducted that the two directions of gas flow alternate, which greatly assists the obtaining of a uniform heat distribution within the column, and therefore a uniform reduction of the whole of its contents.

When the reaction material is reduced to spongy iron, oxidation and production of hydrogen take place by means of steam, the iron being converted into ferroso-ferric oxid, with liberation of hydrogen. For this purpose steam is now admitted to the box 8, by opening the steam valve 25 and adjustment of the three-way cock 24, the gas and air valves being closed. The steam flows from the box 8 through the pipes 10 into and rises upward through the heating chamber 4. The chimney register 31 is kept open meanwhile in order that the gases filling the chamber and displaced upward can escape. After steam has blown through sufficiently to displace such gases the register 31 is closed. This leaves the chamber full of steam superheated by contact with the refractory material. The three-way cock 24 is now so adjusted that the steam flows through the pipe 23 to the top of the heating chamber and downward therethrough, forcing before it the very hot steam of the chamber. This steam, highly superheated by passing through the heating space, enters the column at its open and lower end and flows upward therethrough, forming hydrogen and oxid of iron. The liberated hydrogen in the column is forced downward through the pipes 19 and 27 into the water seal vessel 30, (valve 28 being closed), from which after overcoming the pressure of the head of water, it passes away through the pipe 33 to a place of use or storage (not shown).

The apparatus therefore provides for the operation of a process consisting of a heating stage, a reducing stage and an oxidizing and hydrogen forming stage, the reducing and oxidizing stages alternating with each other regularly while the heating stage may be interpolated as often as required to keep up the temperatures. If desired the heating stage can be combined with the reducing stage when admission of reducing gases takes place from the top in the manner above described and when the emerging gases are burnt in the heating chamber.

By inclosing the column in a closed gastight furnace, so that both the reaction space and the furnace space are practically in direct communication not only is a great pressure difference between the column and the furnace obviated, thereby rendering leakiness of the former of no importance, but also losses of hydrogen gas, which were very considerable in the retort process owing to the permeability of red hot iron to hydrogen and which took place on the slightest damage of the retorts, become quite impossible, since the red hot column wall does not constitute a partition between the hydrogen and the atmosphere, the cold outer wall of the furnace being the surface inclosing the apparatus from the outside. Hydrogen has a very rapid rate of diffusion. In this case however since steam surrounds and enters the retort any pressure differential between the spaces inside and outside the retort does not tend to cause leakage of hydrogen.

Direct heating of the iron charge by combustion in contact with it and consequent rapid fouling of the charge and local overheating and non-uniform temperature of the whole charge, such as are present with shaft furnaces, are avoided in the use of the present apparatus.

Whereas a generator shaft provided with an iron charge can be heated only after the oxidation and hydrogen generating is finished and by a specially interpolated stage, while during or between the other stages a heating stage is impossible since the spongy iron would be reoxidized, in the present apparatus by the production of the several compartments, heating can take place independently of the condition of the iron charge.

A considerable amount of heat is stored up in the refractory sides of the furnace and the firebrick checker, the radiation and conduction from which prevents the temperature in the column from falling too low when the heating stage is not in progress, a feature which is of great importance and acts compensatingly at the different stages of the process.

This use of the furnace as a superheater allows the superheating of the steam and, to some degree, that of the gas to be effected.

The fact of the reaction column being open at one end enables the heated gases to be directly admitted to the column without loss of heat, and to be brought into reaction with a ferrous charge, while badly acting joints and valve devices are eliminated.

At the same time constructional difficulties originating from the great expansion and extension of the red hot retorts, are obviated by using vertically hung retorts free at the lower end, and the charging, emptying, and exchanging of the retorts are facilitated.

Finally the combination of the furnace chamber and column shown avoids all unnecessary cavities and consequently a subsequent fouling of the steam and therefore of the hydrogen by gases retained in such cavities.

Since the distribution devices and valves for the gas and air are all externally accessible, the apparatus is convenient in use.

In the apparatus illustrated in Fig. 2 a pair of concentric cylinders 34 and 35 each open at one end, are arranged in the furnace 1. The ring shaped space 36 formed between the two cylinders serves to receive the ferrous charge. The furnace space 37 surrounding the outer cylinder and the furnace space 38 inclosed by the inner cylinder, are provided with brickwork checkers 39. To fill the reaction space lateral openings 40 with covers are provided, and other lateral openings 41 with covers, for the emptying of the said space.

With this type of apparatus the process is carried out in the following manner:

The valve 42 is opened and reducing gas is admitted through the pipe 43 to the top of the annular space 36. The gas admitted flows downward through this space, reducing the hot oxid and traversing the bottom opening of the same and entering the inner heating space 38. On emerging it is still combustible. For the combustion of this gas, air is admitted through the box 47 and the pipes 48 to the inner heating space 38, the cover 44 being open to permit escape of waste products and the air admission controlled by a valve 46. At the same time the outer furnace space 37 can be heated by opening gas valve 50 and burning gas in such space with the air from the box, the gas being supplied at different levels by pipes 15 and 16. Cover 45 is removed to permit escape of products of combustion.

The covers 44 and 45 and the valve 42 are then closed, and by opening the valves 49 and 50 the reducing gas is admitted simultaneously to the outer and inner heating spaces 37 and 38. The gas penetrates the reaction space 36 after which it is conducted through the pipe 43 for combustion under a steam boiler, not illustrated. The valves 49 and 50 are closed and the valve 51 opened to admit steam for the purpose of scavenging the apparatus. The cover 44 and then the cover 45 are raised meanwhile. Steam passes upward forcing before it the waste gases. The valve 51 is then closed and by opening the valve 52 the steam from the steam pipe 53 is sent into the apparatus, forcing ahead of it the superheated steam remaining in chamber 37. This hot steam passes through the ferrous material in the column, forming hydrogen. The hydrogen formed escapes through the pipe 43 into a receiver, not illustrated.

Fig. 3 illustrates a type of apparatus, in which a cylinder 54 open at one end is fitted gas-tight to the bottom furnace wall, and a second cylinder 55 also open at one end and surrounding the cylinder 54 concentrically, is fitted gas tight to the top furnace wall, so that the outer chamber 37 is in communication with the inner chamber 38 through the reaction space 36.

Annular burner passages 56 are provided for heating the inner furnace space or stove. The inside of the stove is accessible through a door 57, and at the outer circumference of the furnace are provided doors 41 for the emptying of reaction material.

The furnace of Fig. 3 can be operated as follows. The reducing gas is first admitted to the outer space 37 by opening the gate valve 58. Gas flows downward through the outer space 37, becoming thereby superheated, and thence into the reaction space 36, and traverses the same inwardly reducing the iron. The waste gases then pass to the chimney through the open cover 44.

At the same time the inner superheater space 38 can be heated by internal combustion as required by opening gas valve 59 and admitting air by opening the air valve 60.

Hereafter the cover 44 and the air valve 60 are closed, while the cover 45 is opened, the effect of which is that the gas admitted through the valve 59 flows upward through the hot checkerwork and the reaction column in reverse direction, that is downward, and escapes at the lower end of the outer cylinder, into the outer furnace space 37. By opening the valve 61 air is admitted to the annular chamber 62, whence it reaches the outer furnace space 37, so that the reducing gas issuing from the bottom of the reaction column is burnt to heat chamber 37. The waste gases escape through the cover 45 to the chimney.

For the production of hydrogen, the valve 68 is opened and the central superheater space 38 blown through to scavenge it, the cover 44 being open. During this operation the valves 58, 61, 59, 60 and the cover 45 are closed. After the inner heating space 38 has been blown through, the cover 44 is closed, the cover 45 opened, and by opening the valve 63 and suitable adjustment of the three way cock 64 steam is admitted through the pipe 65 to the lower part of the outer heating space 37. After this steam has expelled all foreign gases, the cover 45 is closed, the three-way cock 64 actuated to allow the steam to flow through the pipes 65, 66, 67 into the outer heating space 37. The steam superheated by passage through the heated space 37 enters the reaction space 36 at the bottom. The hydrogen evolved escapes through the pipe 12 into a suitable receiver.

The apparatus of Figs. 2 and 3 have the advantage that owing to the arrangement of the iron charge in thin annular layers and the possibility of heating the said charge from two sides, using a single reaction charge, exceptionally large outputs of hydrogen can be obtained. Further there is derived the additional advantage that the interpolation of separate heating stages can be quite dispensed with, so that time is saved and consequently the output of the apparatus increased, and incidentally there is practically no limit to the size of apparatus that may be used as there will always be a relatively narrow annulus of reaction material in this form of apparatus.

The described processes are obviously only examples. By means of these furnaces the preparation of the gas can be carried out in numerous modified manners. It is obviously possible instead of two cylinders, to arrange a number of the same concentrically to each other and utilize the spaces between the cylinder walls as alternately operating heating and reaction spaces.

The choice of the reaction material for the reaction spaces is of the greatest importance for the carrying out of the process by this apparatus. In the present case the retorts or reaction columns can be made of any fire-resisting or refractory material since the difference of pressure between the furnace space and the inside of the retort or column is insignificant and the wall of the column is not required to resist the passage of gas under pressure. Under these circumstances however, to obtain sufficient transmission of heat from the heated outer sides, the furnace or superheater chamber must be kept at much higher temperatures than are actually required for the reaction.

The retorts or columns may be made of unprotected iron. The heat transmission is then so rapid that not only is very little time lost by the periodic heating and the oxidation stage in particular much shortened, but also the temperature of the furnace can be kept lower. By this means the output per hour of hydrogen by the apparatus is increased, the danger of damage to the ferrous charge eliminated, and the material of the columns protected. When unprotected iron is used the disadvantage of iron retorts, the rapid destruction of the same by oxidation, would make itself felt, were it not for another circumstance which allows this disadvantage to be obviated. The circumstance consists in that with the present apparatus it is possible to periodically wash the columns both externally and internally with a stream of reducing gases. It has been proved that with such treatment even bare iron retorts or columns can be preserved for exceptionally long periods, since the superficial iron oxidized by the furnace gases and steam is always reduced again, the inner core of the iron protected, and its strength and cohesion preserved.

For aeronautical purposes it is well known that the greatest purity of the hydrogen is required. Owing to cavities and porosity of the refractory material it is difficult however to prevent the presence of small amounts of foreign gases in the hydrogen, owing to inefficient blowing through. To drive out any remaining gas from even the smallest pores, according to a further procedure possible with the apparatus of this invention, the heating chambers are provided at various places with iron members or with bricks containing iron oxid or partly coated therewith. These members obviously participate in the reduction or oxidation, according to the nature of the gases passing through. If they have been previously reduced, when the steam is blown through, they will cause an energetic evolution of hydrogen which, owing to its great speed of diffusion, will immediately penetrate into the smallest pores of the fireproof material, and free the same from foreign gases. A portion of hydrogen will be derived from the iron of the retorts or columns, when this material is used.

What I claim is:—

1. In a hydrogen apparatus, a heating chamber, a vertical casing within the chamber and in communication therewith at one end, a pervious ferruginous reaction mass within the casing, means for introducing and burning gas in said chamber and means for passing draft currents of gas and of steam through both the chamber and the casing.

2. In a hydrogen apparatus, a heating chamber, a vertical iron casing within the chamber and in communication therewith at one end, a pervious ferruginous reaction mass within the casing, means for introducing and burning gas in said chamber and means for passing draft currents of gas and of steam through both the chamber and the casing.

3. In a hydrogen apparatus, a pair of concentric cylinders, a ferruginous contact mass in the space between said cylinders, an inclosing combustion chamber surrounding said cylinders and containing a refractory checkerwork, a combustion chamber surrounded by said cylinders, means for introducing combustible gas into each combustion chamber, means for introducing air into each chamber, means for introducing steam into each chamber and means for removing hydrogen from the space between the cylinders.

4. In a hydrogen apparatus, means for maintaining a pervious column of ferruginous reaction material, a heating chamber in heat-imparting relationship to such column, means for introducing air into said heating chamber, means for passing gas through said column and said chamber in succession, means for passing steam through said chamber and said column in succession and means for removing hydrogen from said column.

5. In a hydrogen apparatus, an iron container, a pervious ferruginous charge therein, means for external heating of the container, means for passing gas through the container into the heating means, means for supplying air to the heating means for the combustion of such gas, means for passing steam through the heating chamber into the container and means for removing hydrogen from the container.

6. In a hydrogen apparatus, a vertical furnace chamber containing a refractory checkerwork, a vertical iron casing in heat-receiving relationship to said chamber and in communication therewith at one end, steam introducing means in communication with said chamber at each end, means for introducing air into such chamber, means for introducing combustible gas into such chamber and into such casing and means for removing hydrogen from the container.

7. In a hydrogen apparatus, a heating chamber, a container in heat receiving relationship to said chamber and also having direct communication with said chamber and a porous iron mass in said container, and means whereby the various draft currents necessary in forming hydrogen by the aid of such iron may be passed successively through both chamber and container.

8. An apparatus for the production of hydrogen by the alternate oxidation and reduction of an iron charge through the agency of steam and a reducing gas comprising an annular reaction space between the walls of two concentric vertical cylinders the opposite ends of which are jointed gas-tight to chamber forming elements and the other ends are open, a gas-tight inclosed heating chamber surrounding the reaction space, inlet and outlet pipe connections for the reducing gas and the steam, and means providing communication between these pipes and the heating spaces.

9. An apparatus for the production of hydrogen by the alternate oxidation and reduction of an iron charge through the agency of steam and a reducing gas comprising an annular reaction space between the walls of two concentric vertical cylinders, the opposite ends of which are jointed gas-tight to chamber forming elements and the other ends open, a heating chamber external to the cylinders and communicating through the reaction space with a heating chamber within the inner cylinder, inlet and outlet pipe connections for reducing gas and the steam, means providing communication between these pipes and the heating spaces, and a gas-tight external casing inclosing all the heating and reaction spaces.

10. An apparatus for the production of hydrogen by the alternate oxidation and reduction of an iron charge through the agency of steam and a reducing gas, comprising a reaction vessel inclosed in a gas-tight heating space, a firebrick checker filling in the heating space for the storage of heat, inlet and outlet pipe connections for the reducing gas and the steam, and means for providing communication between these pipes and the heating spaces.

11. An apparatus for the production of hydrogen by the alternate oxidation and reduction of an iron charge through the agency of steam and a reducing gas, comprising a reaction vessel inclosed in a gas-tight heating space, externally opening box-shaped charging and emptying spaces adjacent to the open end of the reaction space and acting simultaneously as supply and distribution means for the heating gases and air of combustion, radially arranged ducts for the introduction of these latter projecting into the interior of the heating space, inlet and outlet pipe connections for the reducing gas and the steam, and means providing communication between these pipes and the heating spaces.

12. An apparatus for the production of hydrogen by the alternate oxidation and reduction of an iron charge through the agency of steam and a reducing gas, comprising a reaction vessel inclosed in a gas-tight heating space, externally opening box-shaped charging and emptying spaces adjacent to the open end of the reaction space, radially arranged ducts projecting into the interior of the heating space, other annular passages surrounding the box-shaped spaces for the introduction of the heating gases and air of combustion, means for regulating the annular passages, inlet and outlet pipes for the reducing gas and the steam, and means for providing communication between these pipes and the heating spaces.

13. Apparatus for the production of hydrogen comprising a furnace containing ferruginous material, a plurality of regenerators, and suitable connections for leading gas to and from the said furnace and regenerators.

14. Apparatus for the production of hydrogen comprising an annular chamber containing ferruginous material, two furnace chambers, one encircling and the other encircled by said annular chamber and suitable connections for leading gas to and from said annular chamber and said furnace chambers.

15. In a hydrogen apparatus, an inner furnace chamber having an outer wall, an annular pervious column of ferruginous reaction material encircling said chamber and means for leading gas and steam through the ferruginous reaction material.

16. In a hydrogen apparatus, an inner furnace chamber having an outer wall, an annular pervious column of ferruginous reaction material encircling said chamber, means for passing reducing gas and draft currents of steam alternately into and through said ferruginous material and means for removing the hydrogen produced in steaming.

17. In a hydrogen apparatus, two spaced walls of heat transferring material, a mass of ferruginous reaction material retained between said walls and combustion chambers on opposite sides of said mass and separated therefrom by said walls.

18. In a hydrogen apparatus, a mass of ferruginous reaction material, a combustion chamber, a heat transferring partition separating the same, and means for leading draft currents of gas and steam through said combustion chamber and through said material and for burning gas in said combustion chamber.

19. In a hydrogen apparatus, a wall of refractory material, an iron septum spaced away therefrom to form a combustion chamber therebetween, a pervious column of ferruginous reaction material on the opposite side of said septum, means for producing combustion in said combustion chamber, means for alternately passing draft currents of reducing gases and of steam into and through said column and means for removing the hydrogen produced in steaming.

In testimony whereof I affix my signature in presence of two witnesses.

ANTON MESSERSCHMITT.

Witnesses:
LOUIS VANDORY,
TH. THRUENBEREND.